United States Patent
Tu et al.

(10) Patent No.: US 12,028,491 B2
(45) Date of Patent: Jul. 2, 2024

(54) SCANNING PREVIEW METHOD FOR A REMOTE APPLICATION WHEN USING SCANNER REDIRECTION FOR REMOTE DESKTOP SERVICES

(71) Applicant: VMware, Inc., Palo Alto, CA (US)

(72) Inventors: Zhongzheng Tu, Beijing (CN); Weigang Huang, Beijing (CN); Huiyong Huo, Beijing (CN); Mingsheng Zang, Beijing (CN); Yueting Zhang, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/897,780

(22) Filed: Aug. 29, 2022

(65) Prior Publication Data
US 2024/0022670 A1 Jan. 18, 2024

(30) Foreign Application Priority Data
Jul. 18, 2022 (WO) .............. PCT/CN2022/106193

(51) Int. Cl.
*H04N 1/00* (2006.01)
*G06F 9/451* (2018.01)

(52) U.S. Cl.
CPC ......... *H04N 1/00225* (2013.01); *G06F 9/452* (2018.02); *H04N 1/00129* (2013.01);
(Continued)

(58) Field of Classification Search
CPC ........... H04N 1/00225; H04N 1/00129; H04N 1/00217; H04N 1/00244; H04N 1/0044; G06F 9/452
See application file for complete search history.

(56) References Cited

U.S. PATENT DOCUMENTS 7,012,706 B1    3/2006    Hansen
8,913,285 B1 * 12/2014    Neubrand ............ H04N 1/3873
                                                     358/1.9

(Continued)

OTHER PUBLICATIONS

DYNAMSOFT ("Document Scanner—TWAIN, WIA, ISIS or SANE," Jan. 7, 2020, 8 pages, Retrieved from the Internet Aug. 28, 2022, URL: https://www.dynamsoft.com/blog/insights/document-scanning-twain-wia-isis-sane/). (Year: 2020).*

(Continued)

*Primary Examiner* — Akwasi M Sarpong
*Assistant Examiner* — Pawan Dhingra
(74) *Attorney, Agent, or Firm* — Kim & Stewart LLP

(57) ABSTRACT

A scanning preview method for a remote desktop system that includes a client computing device that has running therein a remote desktop client application including a scanner redirection module, and a host server, the scanner redirection module including a scanner core that is configured to communicate with a physical scanner, includes the steps of: receiving from an application running on the host server, a request for a preview of a scanned image; in response to the request for the preview of the scanned image, transmitting to the scanner core a request to acquire the scanned image from the physical scanner; and upon receiving the scanned image from the scanner core, transmitting the scanned image to the application, and in response thereto, receiving from the application an image of a remote desktop that includes the scanned image.

20 Claims, 7 Drawing Sheets

(52) U.S. Cl.
CPC ..... *H04N 1/00217* (2013.01); *H04N 1/00244* (2013.01); *H04N 1/0044* (2013.01)

(56) References Cited

U.S. PATENT DOCUMENTS

| | | | |
|---|---|---|---|
| 9,489,471 | B2 | 11/2016 | Venkatesh |
| 10,230,855 | B1 | 3/2019 | Sarreo et al. |
| 10,536,559 | B2 | 1/2020 | Vajravel |
| 11,716,428 | B1 | 8/2023 | Tu et al. |
| 11,750,749 | B1 | 9/2023 | Tu et al. |
| 2006/0023951 | A1 | 2/2006 | Tan |
| 2006/0070090 | A1 | 3/2006 | Gulkis |
| 2007/0050616 | A1 | 3/2007 | Masui et al. |
| 2008/0137129 | A1 | 6/2008 | Ferlitsch |
| 2008/0239329 | A1* | 10/2008 | Kitada ............... H04N 1/00501 358/1.15 |
| 2009/0141931 | A1 | 6/2009 | Yadid-Pecht et al. |
| 2009/0237728 | A1* | 9/2009 | Yamamoto ......... H04N 1/00204 358/1.15 |
| 2009/0284807 | A1 | 11/2009 | Niculescu |
| 2010/0079797 | A1 | 4/2010 | Ohara |
| 2010/0223340 | A1* | 9/2010 | Pope ................. H04N 1/00225 709/206 |
| 2010/0296120 | A1 | 11/2010 | Hanano |
| 2010/0315675 | A1* | 12/2010 | Yagi ................... H04N 1/32096 358/1.15 |
| 2011/0013003 | A1 | 1/2011 | Thompson et al. |
| 2011/0016475 | A1 | 1/2011 | Merna |
| 2011/0051190 | A1 | 3/2011 | Abe |
| 2011/0055765 | A1* | 3/2011 | Neubrand .......... H04N 1/32122 713/400 |
| 2012/0167208 | A1 | 6/2012 | Buford et al. |
| 2013/0054543 | A1 | 2/2013 | Brown |
| 2014/0118767 | A1 | 5/2014 | Kim et al. |
| 2015/0055197 | A1 | 2/2015 | Romanoff et al. |
| 2016/0006888 | A1* | 1/2016 | Migishima ......... H04N 1/00244 358/438 |
| 2016/0006901 | A1* | 1/2016 | Torigoshi ................ H04L 41/24 358/1.15 |
| 2017/0289313 | A1 | 10/2017 | Vajravel |
| 2018/0082093 | A1 | 3/2018 | Crooks et al. |
| 2018/0234517 | A1* | 8/2018 | Venkatesh ............. H04L 67/563 |
| 2019/0064510 | A1 | 2/2019 | Flohr |
| 2019/0394343 | A1 | 12/2019 | Sahara |
| 2020/0310704 | A1 | 10/2020 | Hanano |
| 2021/0141579 | A1* | 5/2021 | Yuan ...................... G06F 3/121 |
| 2021/0227083 | A1 | 7/2021 | Shiraishi |
| 2021/0344780 | A1* | 11/2021 | Tomes ..................... G06T 1/60 |
| 2024/0020136 | A1 | 1/2024 | Tu et al. |
| 2024/0020137 | A1 | 1/2024 | Tu et al. |

OTHER PUBLICATIONS

DYNAMSOFT "Document Scanner—TWAIN, WIA, ISIS or SANE," Jan. 7, 2020, 8 pages, Retrieved from the Internet Aug. 28, 2022, URL: https://www.dynamsoft.com/blog/insights/document-scanning-twain-wia-isis-sane/.

TWAIN Resource Site—Home Page, 2022, 4 pages, Retrieved from the Internet Aug. 28, 2022, URL: https://twain.org/.

International Search Report and Written Opinion dated May 16, 2023 in International Application No. PCT/US23/11293, 16 pages.

Notice of Allowance dated Apr. 28, 2023 in related U.S. Appl. No. 17/897,801.

Notice of Allowance dated Mar. 24, 2023 in U.S. Appl. No. 17/897,822, 14 pages.

Non-Final Office Action dated Feb. 2, 2024 in U.S. Appl. No. 17/897,842, 31 pages.

Non-Final Office Action dated Feb. 15, 2024 in U.S. Appl. No. 17/897,866, 34 pages.

\* cited by examiner

SCANNING PREVIEW METHOD FOR A REMOTE APPLICATION WHEN USING SCANNER REDIRECTION FOR REMOTE DESKTOP SERVICES

CROSS-REFERENCE

This application is based upon and claims the benefit of priority from International Patent Application No. PCT/CN2022/106193, filed on Jul. 18, 2022, the entire contents of which are incorporated herein by reference.

BACKGROUND

Many organizations rely on remote desktop services to provide lean, flexible computing environments. Remote desktop scanning preview is one important feature required by the end user of a remote desktop service. Preview allows the user to view what a scanned image will look like before the user decides to execute scanning on one or more images. However, when the source of remote desktop scanning preview is a client-side scanner, processing of scan preview commands issued during remote sessions is inefficient and often results in crashes. Additionally, some scanners do not provide preview functionality at all, especially "sheet-fed" scanners, which generally do not provide such functionality. A robust and efficient method to realize scanner redirection between a client computing device and a host server during a remote session for all types of scanners, including for those that do not provide their own preview functionality, is needed.

SUMMARY

Accordingly, one or more embodiments provide a scanning preview method for a remote desktop system that includes a client computing device that has running therein a remote desktop client application including a scanner redirection module, and a host server, the scanner redirection module including a "scanner core" that is configured to communicate with a physical scanner. According to some embodiments, the scanner core is a "data source." According to other embodiments, the scanner core is an "image capture core." As used herein, "image capture core" is a service running in an operating system of the client computing device that exposes application programming interfaces (APIs) to communicate with one or more connected image capturing devices such as physical scanners, to discover properties of the image capturing devices and to instruct the image capturing devices to perform their native functions and acquire images from the image capturing devices.

The scanning preview method according to one or more embodiments includes steps of receiving from an application running on the host server, a request for a preview of a scanned image; in response to the request for the preview of the scanned image, transmitting to the scanner core a request to acquire the scanned image from the physical scanner; and upon receiving the scanned image from the scanner core, transmitting the scanned image to the application, and in response thereto, receiving from the application an image of a remote desktop that includes the scanned image.

Further embodiments include a non-transitory computer-readable storage medium comprising instructions that cause a remote desktop system to carry out the above method, as well as a remote desktop system configured to carry out the above method.

DETAILED DESCRIPTION

Figure 1:
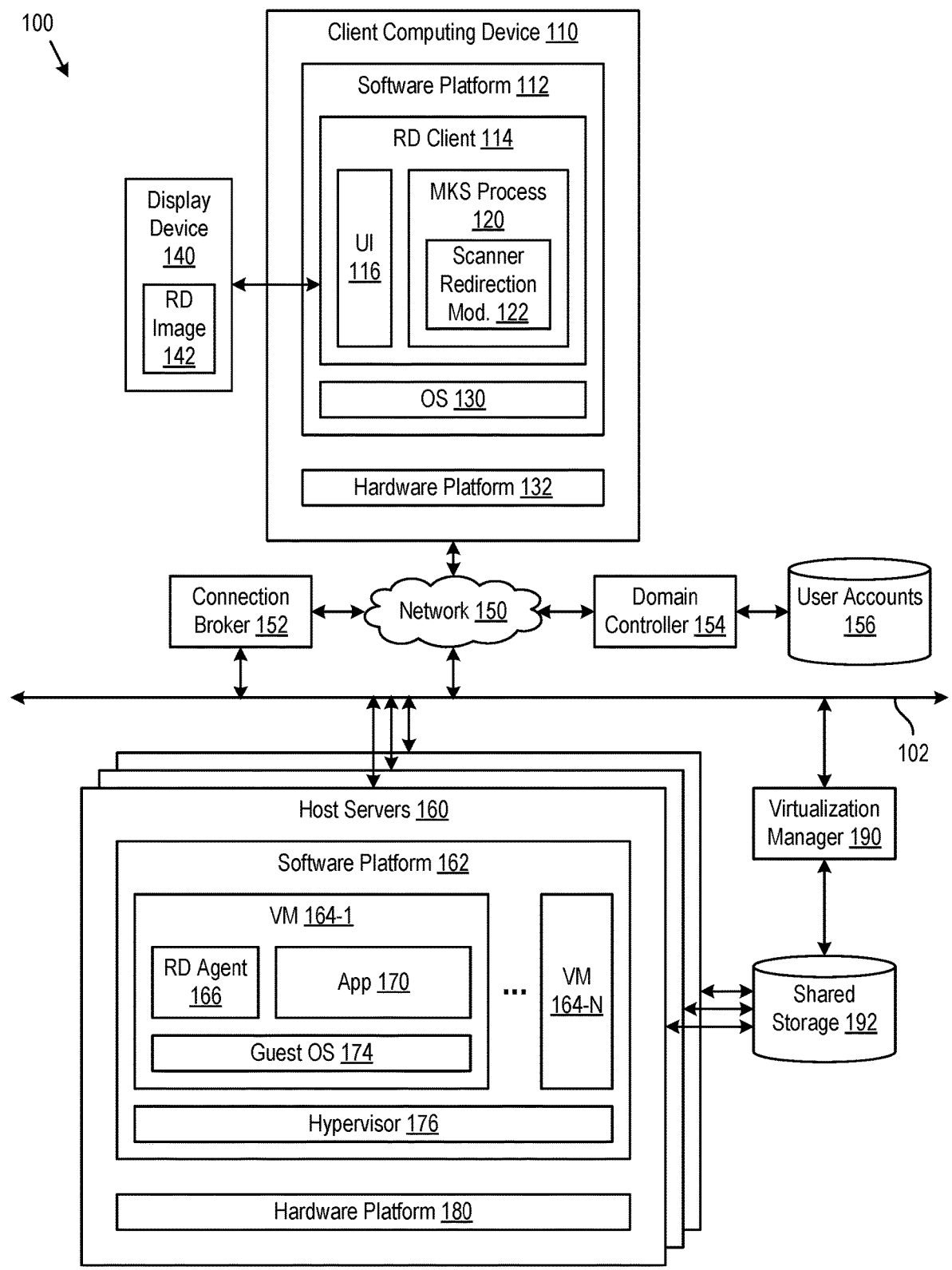
FIG. 1 is a block diagram of a virtualized desktop infrastructure system in which embodiments may be implemented.

Techniques for realizing scanning preview between a client computing device and a host server during a remote session are described. A guest operating system (OS) in a virtual machine (VM) of the host server executes an application that requires an image scanned by a physical scanner that is connected to the client computing device, to be previewed. Accordingly, the application in the VM of the host server requests a preview of the image from a module of a remote desktop (RD) client application, referred to as a "scanner redirection module." The scanner redirection module acquires the image from the physical scanner and transmits the image to the application in the VM of the host server.

According to a first embodiment, to realize the described scanner redirection, both the scanner redirection module of the RD client application and the application in the VM of the host server utilize a robust scanning protocol such as the TWAIN protocol. Pursuant to the scanning protocol, the scanner redirection module and the application in the VM of the host server each utilize a "data source manager" and a "data source." For the application in the VM of the host server, the data source manager communicates with a "virtual" data source that requests scanned images from the scanner redirection module. For the scanner redirection module, the data source manager communicates with a data source that is configured to communicate with the physical scanner to acquire scanned images for transmitting to the application in the VM of the host server.

According to a second embodiment, the client computing device and VM of the host server run different OSs. As a result, to realize the described scanner redirection, the scanner redirection module and the application in the VM of the host server utilize robust but different scanning protocols such as the Image Capture (ICA) framework and the TWAIN protocol. Pursuant to its respective scanning protocol, the application in the VM of the host server utilizes a data source manager and a virtual data source. Like in the first embodiment, the data source manager communicates with the virtual data source, which requests scanned images from the scanner redirection module. Pursuant the other scanning protocol, the scanner redirection module utilizes an "image capture core" that is configured to communicate with the physical scanner to acquire scanned images for transmitting to the application in the VM of the host server.

Embodiments are applicable to different types of scanners, including "flatbed" scanners that scan one image at a time and "sheet-fed" scanners that are capable of scanning multiple images at a time. In the case of flatbed scanners and sheet-fed scanners when only one image is scanned, the scanned image is previewed on a display device connected to the client computing device. In the case of sheet-fed scanners when multiple images are scanned, only the first image scanned is previewed. These and further aspects of the invention are discussed below with respect to the drawings.

FIG. 1 is a block diagram of a virtualized desktop infrastructure (VDI) system 100 (also referred to as an RD computer system) in which scanning preview according to embodiments may be implemented. VDI system 100 includes a client computing device 110 and a plurality of host servers 160 that are remote from client computing device 110, e.g., in a remote data center. Client computing device 110 is constructed on a hardware platform 132 such as an x86 architecture platform. Hardware platform 132 includes conventional components (not shown) of a computing device, such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computing device 110 to communicate with host servers 160 over a physical network 150 such as the Internet.

Client computing device 110 includes a software platform 112 on which an RD client software program 114 runs on an OS 130, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse. One of host servers 160 transmits an image 142 of an RD to a mouse, keyboard, screen (MKS) process 120 of RD client 114. RD client 114 then communicates with a display device 140 such as a monitor on which the user views RD image 142.

When the user performs actions in the RD such as clicking a mouse or typing on a keyboard, the user's actions are transmitted to MKS process 120. MKS process 120 transmits the user's actions to host server 160 to update the user's RD accordingly. MKS process 120 also includes a scanner redirection module 122 that acquires scanned images from one or more physical scanners (not shown) connected to client computing device 110. The user selects among the physical scanners via a user interface (UI) 116 of RD client 114, and RD client 114 transmits identifications of the selected scanners to scanner redirection module 122. Scanner redirection module 122 transmits such scanned images to host server 160. Scanner redirection module 122 is discussed further below in conjunction with FIGS. 2 and 3.

VDI system 100 includes a domain controller 154 such as Microsoft Active Directory® that manages user accounts 156 including the user's log-in information for the RD. VDI system 100 also includes a connection broker 152 that manages connections between RD client 114 and a host server running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 180. Hardware platform 180 is, e.g., a server-grade x86 architecture platform including the conventional components of a computing device described above for hardware platform 132. Software platform 162 includes a hypervisor 176, which is a virtualization software layer that supports a VM execution space within which VMs 164 are concurrently instantiated and executed. One example of hypervisor 176 is a VMware ESX® hypervisor, available from VMware, Inc.

Each of host servers 160 is controlled by a virtualization manager 190, and hardware platform 180 of each of host servers 160 is coupled to a shared persistent storage system 192. Virtualization manager 190 logically groups host servers 160 into a cluster to perform cluster-level tasks such as provisioning and managing VMs 164 and migrating VMs 164 from one of host servers 160 to another. Virtualization manager 190 communicates with host servers 160 via a management network (not shown) provisioned from a physical network 102 such as a local area network (LAN) of a remote data center. Virtualization manager 190 may be, e.g., a physical server or one of VMs 164. One example of virtualization manager 190 is VMware vCenter Server,® available from VMware, Inc.

VM 164-1 includes an RD agent software program 166 and an application 170 running on a guest OS 174, which is a commodity OS. RD agent 166 communicates with RD client 114 to establish a session for the user's RD. RD image 142 is generated in VM 164-1 and transmitted by RD agent 166 to RD client 114 via MKS process 120 to be displayed on display device 140. Application 170 requires images to be scanned by the physical scanner(s) connected to client computing device 110. Application 170 has been modified to handle scanner redirection with scanner redirection module 122. In one example, application 170 is Adobe Photoshop, which the user is accessing through the RD session. Application 170 is discussed further below in conjunction with FIGS. 2 and 3. A particular configuration of VDI system 100 is illustrated in FIG. 1, but it should be recognized that one or more embodiments may be practiced with other computer system configurations.

Figure 2:
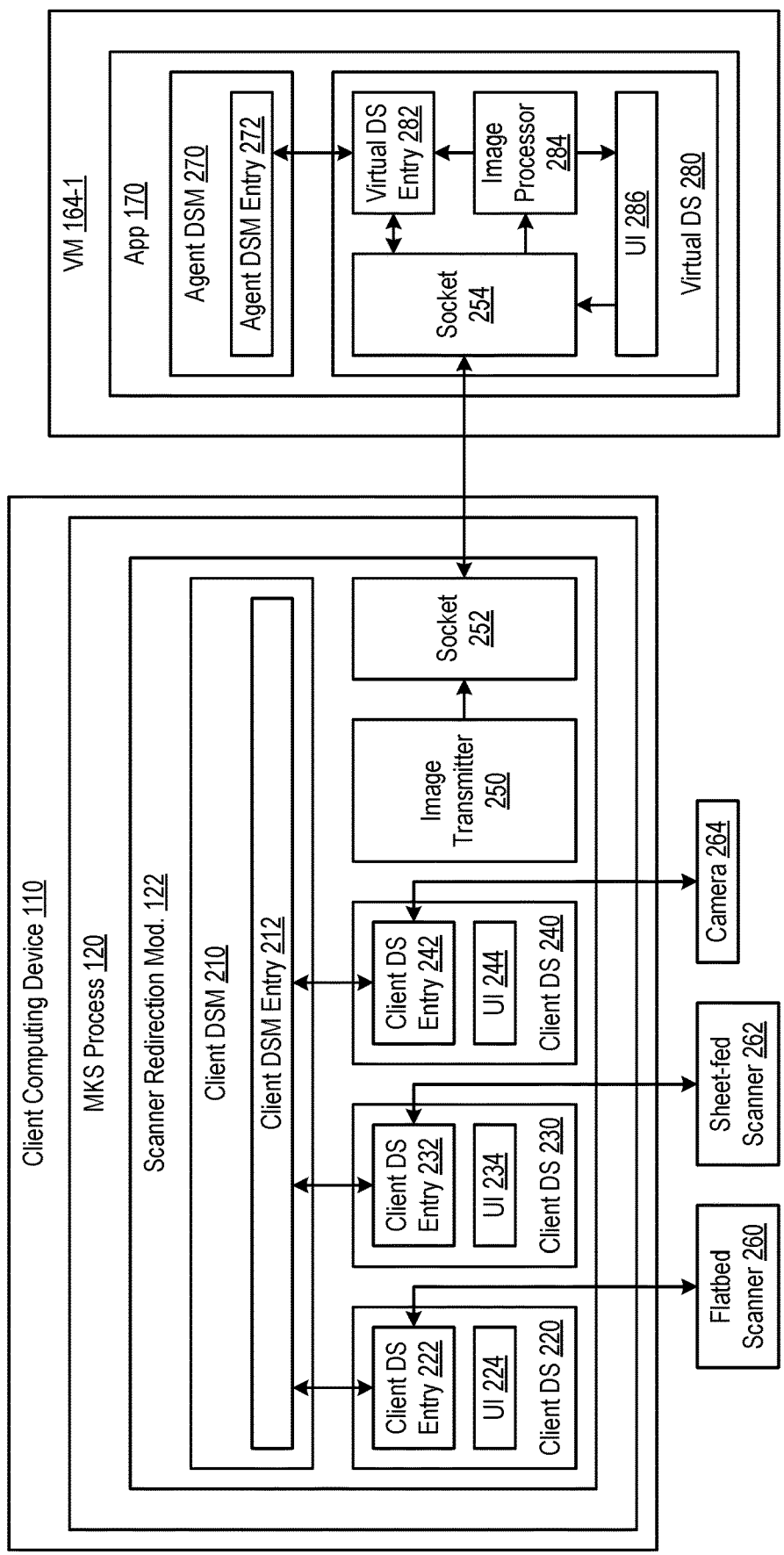
FIG. 2 is a block diagram of a client computing device and a virtual machine running on a host server, of the virtualized desktop infrastructure system, according to a first embodiment.

FIG. 2 is a block diagram illustrating client computing device 110 and VM 164-1 of VDI system 100 according to a first embodiment in which scanner redirection module 122 and application 170 use the same scanning protocol. Client computing device 110 is connected to three physical scanners: a flatbed scanner 260, a sheet-fed scanner 262, and a camera 264. Scanner redirection module 122 of client computing device 110 includes a client data source manager (DSM) 210 that communicates with scanner cores to acquire scanned images. According to the first embodiment, the scanner cores are client data sources (DSs) 220, 230, and 240. Client DSs 220, 230, and 240 are configured to communicate with flatbed scanner 260, sheet-fed scanner 262, and camera 264, respectively. Although illustrated as communicating directly with the physical scanners, client DSs 220, 230, and 240 may also communicate with separate drivers in OS 130 to acquire scanned images from the physical scanners.

Communication between scanner redirection module 122 and the physical scanners is carried out via client DSM 210 and the client DSs. Specifically, scanner redirection module 122 calls a "client DSM entry" function 212 to transmit commands to client DSM 210. Client DSM 210 calls "client DS entry" functions 222, 232, and 242 to transmit commands to client DSs 220, 230, and 240, respectively. The client DSs also return results to client DSM 210 via return values of client DS entry calls. Similarly, client DSM 210 provides results via return values of client DSM entry 212 calls.

Client DSs 220, 230, and 240 have UIs 224, 234, and 244 for adjusting scanner properties of physical scanners, previewing images, and beginning the scanning of images. According to embodiments, UIs 224, 234, and 244 can be disabled to instead present a user a UI 286 of application 170, as discussed further below. When one of the client DSs acquires a scanned image from a respective physical scanner, the client DS returns the scanned image to client DSM 210 to be further transmitted to an image transmitter 250. Image transmitter 250 transmits the scanned image to application 170 of VM 164-1 via sockets 252 and 254 of scanner redirection module 122 and application 170, respectively.

Application 170 includes an agent DSM 270 that communicates with a virtual DS 280 to request scanned images. Virtual DS 280 is configured to communicate with scanner redirection module 122 to acquire scanned images from the physical scanners. Application 170 calls an "agent DSM entry" function 272 to transmit commands to agent DSM 270. Agent DSM 270 calls a "virtual DS entry" function 282 to transmit commands to virtual DS 280. Virtual DS 280 also returns results to agent DSM 270 via return values of virtual DS entry 282 calls. Similarly, agent DSM 270 provides results via return values of agent DSM entry 272 calls. Virtual DS 280 has a UI 286 for allowing the user to adjust scanner properties of physical scanners, preview images, and begin scanning images. Accordingly, the user can perform such actions via UI 286 while UIs 224, 234, and 244 are disabled.

As previously mentioned, application 170 receives scanned images from scanner redirection module 122 via sockets 252 and 254. Specifically, the scanned images are received by an image processor 284 of virtual DS 280 that renders the scanned images, e.g., rotating upside-down images so that they face right-side-up. When the user requests scanned images via UI 286, image processor 284 returns scanned images to virtual DS 280, which returns the scanned images to agent DSM 270 to be further returned to application 170. On the other hand, when the user only requests a preview of a scanned image via UI 286, image processor 284 returns the scanned image to UI 286 to be displayed to the user, as discussed further below in conjunction with FIG. 7.

Figure 3:
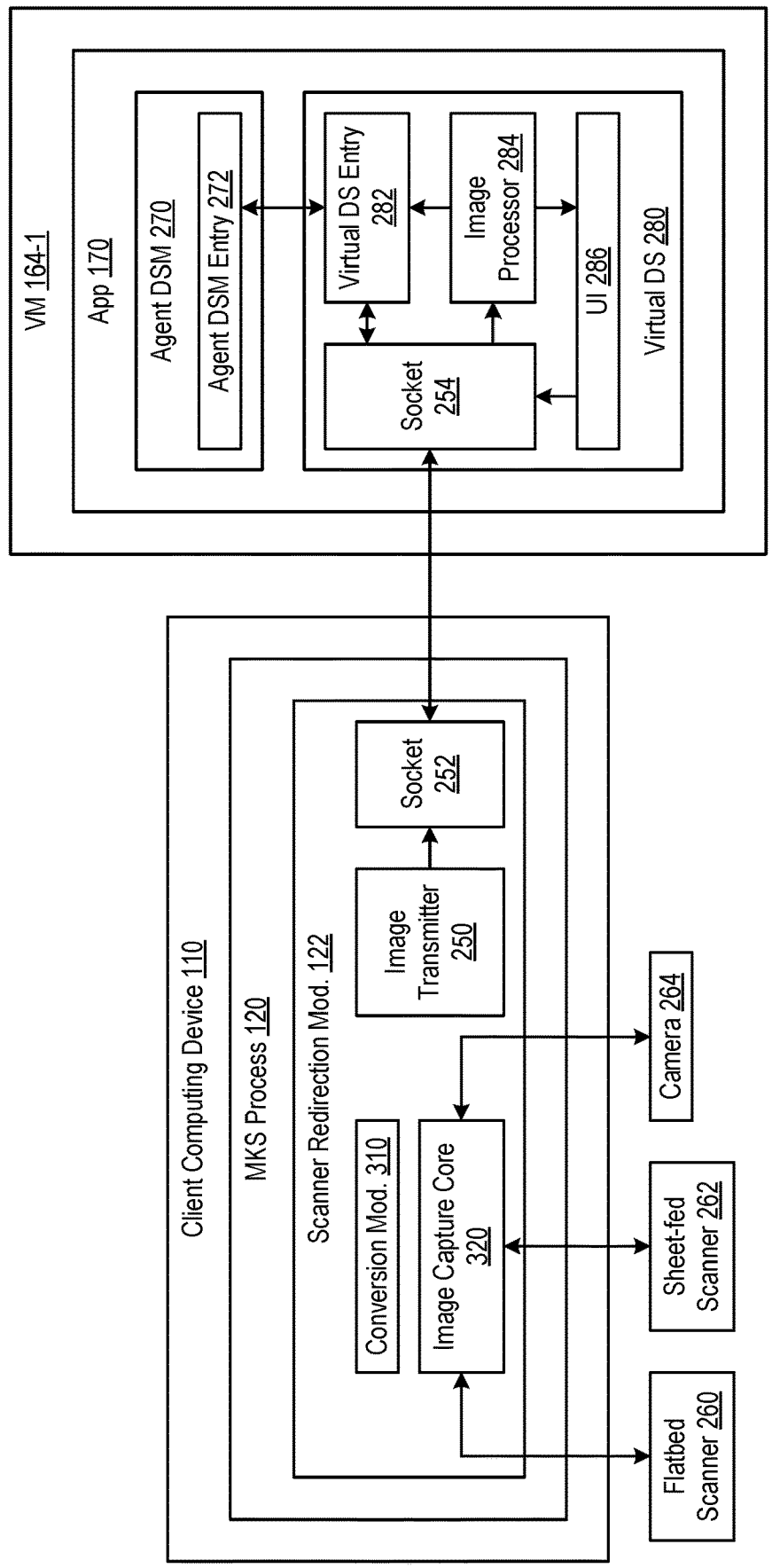
FIG. 3 is a block diagram of the client computing device and the virtual machine of the virtualized desktop infrastructure system according to a second embodiment.

FIG. 3 is a block diagram illustrating client computing device 110 and VM 164-1 of VDI system 100 according to a second embodiment in which scanner redirection module 122 and application 170 use different scanning protocols. Like the first embodiment, scanner redirection module 122 of client computing device 110 includes a scanner core that communicates with flatbed scanner 260, sheet-fed scanner 262, and camera 264 to acquire scanned images therefrom. However, according to the second embodiment, the scanner core is an "image capture core 320." Although illustrated as communicating directly with the physical scanners, image capture core 320 may also communicate with separate drivers in OS 130 to acquire scanned images from the physical scanners. After image capture core 320 acquires a scanned image from a physical scanner, scanner redirection module 122 transmits the scanned image to image transmitter 250 to be transmitted to application 170 of VM 164-1 via sockets 252 and 254.

Because scanner redirection module 122 and application 170 use different scanning protocols, scanner redirection module 122 also includes a conversion module 310 that converts data between being described according to the different scanning protocols. For example, if virtual DS 280 requests to view properties of the physical scanners, upon image capture core 320 acquiring the properties, conversion module 310 converts the properties to be described according to the scanning protocol of application 170 before the properties are transmitted to virtual DS 280. Similarly, for example, if virtual DS 280 requests to adjust a property of one of the physical scanners, conversion module 310 converts the desired adjustment to be described according to the scanning protocol of scanner redirection module 122 before the desired adjustment is transmitted to image capture core 320. To perform the communication between scanner redirection module 122 and individual components thereof and between individual components thereof, calls are made via APIs defined by scanner redirection module 122, conversion module 310, image capture core 320, and image transmitter 250.

As with the first embodiment, application 170 includes agent DSM 270, which communicates with virtual DS 280 to request scanned images, and virtual DS 280 is configured to communicate with scanner redirection module 122 to acquire scanned images from the physical scanners. When the user requests previews of scanned images via UI 286, scanned images are received by image processor 284 from scanner redirection module 122, to be transmitted to UI 286 and displayed to the user.

Figure 4:
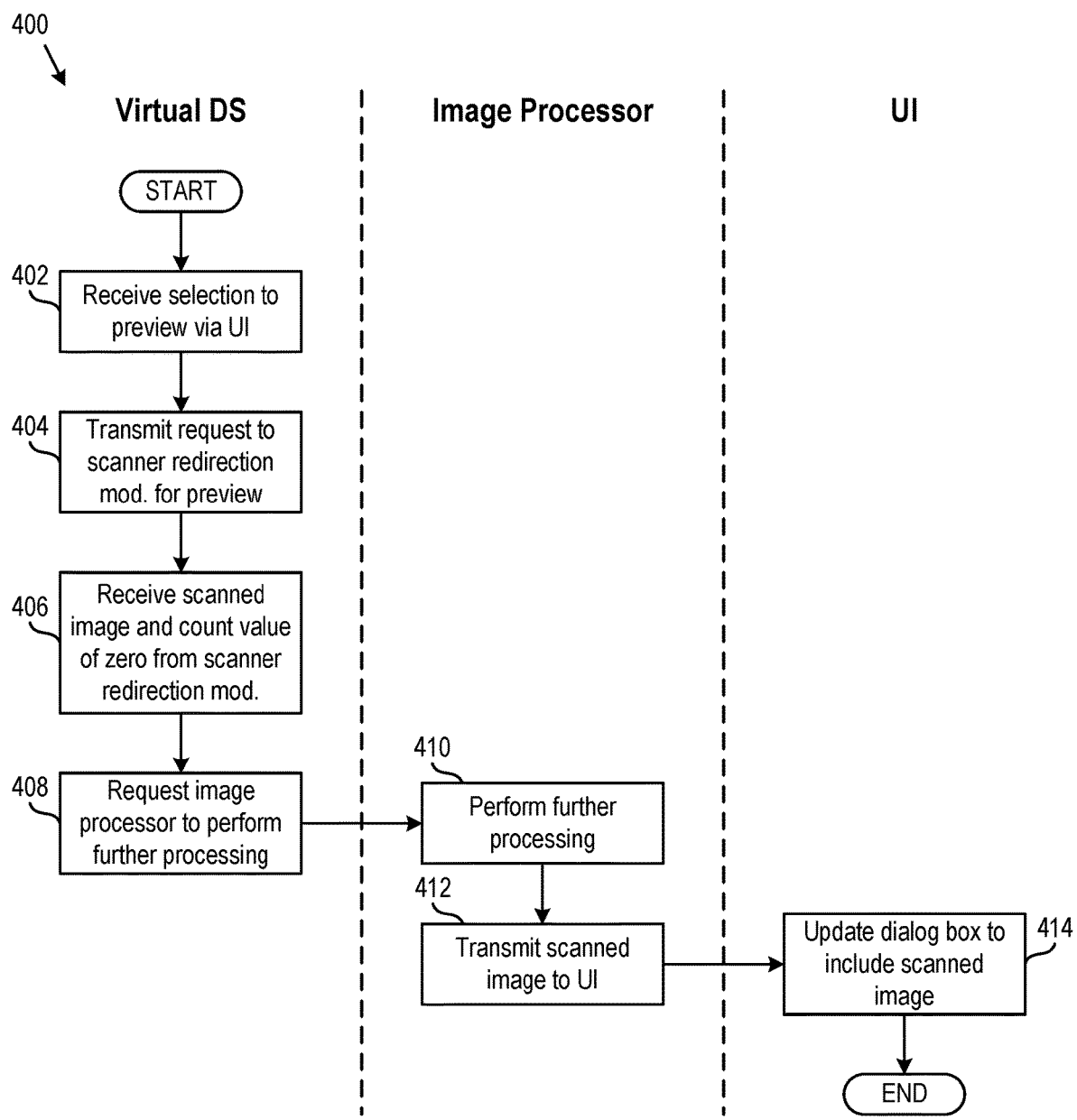
FIG. 4 is a flow diagram of steps performed by an application of the virtual machine to carry out a method of acquiring a scanned image from a scanner redirection module of the client computing device, to preview on a remote desktop, according to embodiments.

FIG. 4 is a flow diagram of steps performed by application 170 of VM 164-1 to carry out a method 400 of acquiring a scanned image from scanner redirection module 122 of client computing device 110, to preview on the RD, according to embodiments. At step 402, virtual DS 280 receives a request via UI 286 to preview a scanned image from a physical scanner, e.g., flatbed scanner 260. At step 404, virtual DS 280 transmits a request for the preview of the scanned image to scanner redirection module 122 via sockets 252 and 254.

At step 406, virtual DS 280 receives the scanned image and a "count" value of zero from scanner redirection module 122 via sockets 252 and 254. Count is a variable indicating whether there are any pending scanned images yet to be retrieved from a physical scanner. A count value of zero indicates that there are no pending scanned images, while a nonzero count value indicates that there is at least one pending scanned image. It should be noted that the count value received from scanner redirection module 122 in response to a request for a preview is always zero because only one image is previewed. In the case of a flatbed scanner or a sheet-fed scanner that have only scanned one image, the previewed image is the scanned image. In the case of a sheet-fed scanner that has scanned a plurality of images, the previewed image is the first-scanned image.

At step 408, virtual DS 280 requests image processor 284 to perform further processing on the scanned image. At step 410, image processor 284 performs further processing, e.g., rotating the scanned image to face right-side-up. At step 412, image processor 284 transmits the scanned image to UI 286. At step 414, UI 286 updates a dialog box thereof to include the scanned image. After step 414, method 400 ends, and the user views an image of the RD, as discussed further below in conjunction with FIG. 7.

Figure 5:
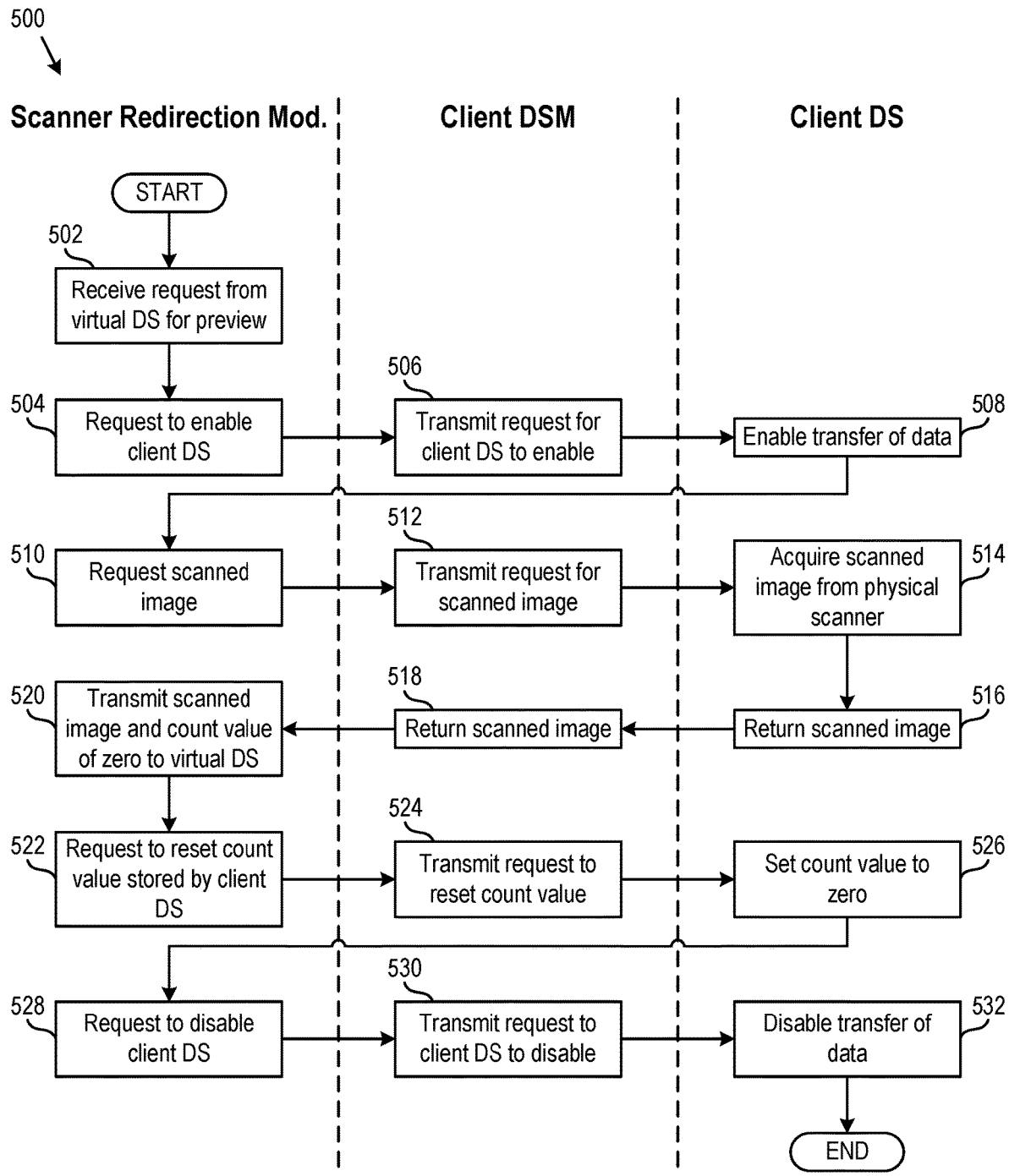
FIG. 5 is a flow diagram of steps performed by the scanner redirection module of the client computing device to carry out a method of acquiring a scanned image from a physical scanner to be previewed, according to the first embodiment.

FIG. 5 is a flow diagram of steps performed by scanner redirection module 122 of client computing device 110 to carry out a method 500 of acquiring a scanned image from a physical scanner to be previewed, according to the first embodiment. At step 502, scanner redirection module 122 receives a request for a preview of a scanned image, from virtual DS 280 via sockets 252 and 254. At step 504, scanner redirection module 122 calls client DSM entry 212 to request client DSM 210 to enable one of the client DSs of scanner redirection module 122, which corresponds to a physical scanner the user previously designated via UI 116, scanner redirection module 122 having then received an identification of the physical scanner from RD client 114. For example, method 500 will be discussed with reference to client DS 230.

At step 506, client DSM 210 calls client DS entry 232 to transmit a request to client DS 230 to enable. At step 508, client DS 230 enables the transfer of data from sheet-fed scanner 262. It should be noted that client DS 230 does not show UI 234. The user has already selected to preview an image via UI 286 of virtual DS 280 at step 402 of method 400 of FIG. 4. At step 510, scanner redirection module 122 calls client DSM entry 212 to request client DSM 210 for the scanned image. At step 512, client DSM 210 calls client DS entry 232 to transmit a request to client DS 230 for the scanned image.

At step 514, client DS 230 acquires the scanned image from sheet-fed scanner 262. Specifically, client DS 230 transmits a request to sheet-fed scanner 262 for a scanned image, at which point sheet-fed scanner 262 scans any papers inserted into sheet-fed scanner 262. If there is a plurality of papers inserted into sheet-fed scanner 262 or a single paper with multiple sides to scan, sheet-fed scanner 262 scans a plurality of images and returns the first-scanned image. Otherwise, if there is only a single paper with one side to scan, sheet-fed scanner 262 scans only a single image, as would be the case if flatbed scanner 260 were requested for a scanned image, and returns the scanned image.

At step 516, client DS 230 transmits the scanned image to client DSM 210 as a return value of the call to client DS entry 232 at step 512. At step 518, client DSM 210 reports the scanned image as a return value of the call to client DSM entry 212 at step 510. At step 520, scanner redirection module 122 transmits the scanned image and a count value of zero to virtual DS 280 via sockets 252 and 254. At step 522, scanner redirection module 122 calls client DSM entry 212 to request client DSM 210 to reset a count value stored by client DS 230. At step 524, client DSM 210 calls client DS entry 232 to transmit a request to client DS 230 to reset the stored count value.

At step 526, client DS 230 sets the stored count value to zero at which point client DS 230 is in a state at which it will not acquire scanned images from sheet-fed scanner 262. At step 528, scanner redirection module 122 calls client DSM entry 212 to request client DSM 210 to disable client DS 230. At step 530, client DSM 210 calls client DS entry 232 to transmit a request to client DS 230 to disable. At step 532, client DS 230 disables the transfer of data from sheet-fed scanner 262. After step 532, method 500 ends.

Figure 6:
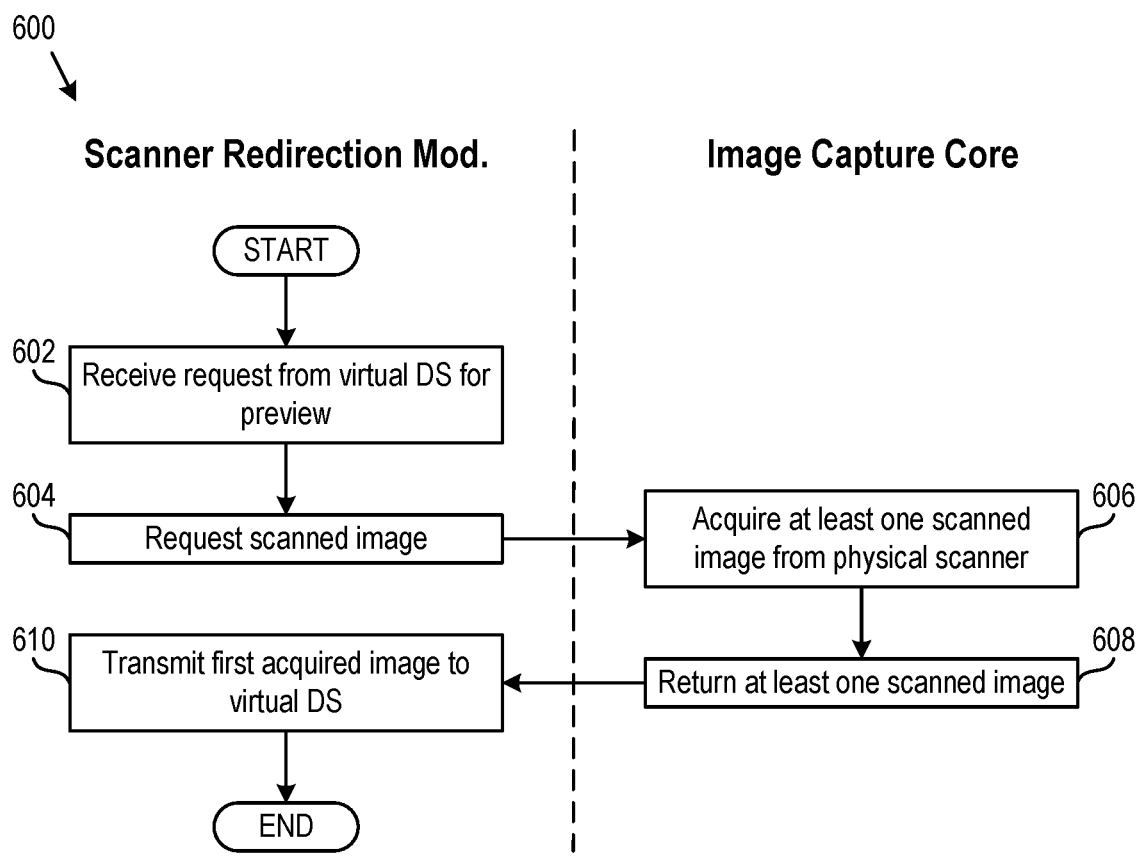
FIG. 6 is a flow diagram of steps performed by the scanner redirection module of the client computing device to carry out a method of acquiring a scanned image from a physical scanner to be previewed, according to the second embodiment.

FIG. 6 is a flow diagram of steps performed by scanner redirection module 122 of client computing device 110 to carry out a method 600 of acquiring a scanned image from a physical scanner to be previewed, according to the second embodiment. For example, method 600 will be discussed with respect to sheet-fed scanner 262. At step 602, scanner redirection module 122 receives a request for a preview of a scanned image, from virtual DS 280 via sockets 252 and 254. At step 604, scanner redirection module 122 makes an API call to image capture core 320 to request image capture core 320 for the scanned image.

At step 606, image capture core 320 acquires at least one scanned image from sheet-fed scanner 262, which the user previously designated via UI 116, scanner redirection module 122 having then received an identification of sheet-fed scanner 262 from RD client 114. Specifically, image capture core 320 transmits a request to sheet-fed scanner 262 for a scanned image, at which point sheet-fed scanner 262 scans any inserted papers. If there is a plurality of papers inserted into sheet-fed scanner 262 or a single paper with multiple sides to scan, sheet-fed scanner 262 scans a plurality of images and returns the images asynchronously. Otherwise, if there is only a single paper with one side to scan, sheet-fed scanner 262 scans only a single image, as would be the case if flatbed scanner 260 were requested for a scanned image, and returns the scanned image.

At step 608, image capture core 320 returns the scanned image(s) acquired at step 606 to scanner redirection module 122. At step 610, scanner redirection module 122 transmits the first image acquired at step 606 to virtual DS 280 via sockets 252 and 254. Any other acquired images are deleted. After step 610, method 600 ends. It should be noted that because image capture core 320 acquires scanned images asynchronously, image capture core 320 may acquire more scanned images after step 606. However, such scanned images are then deleted because scanner redirection module 122 only returns the first-scanned image in response to a preview request.

Figure 7:
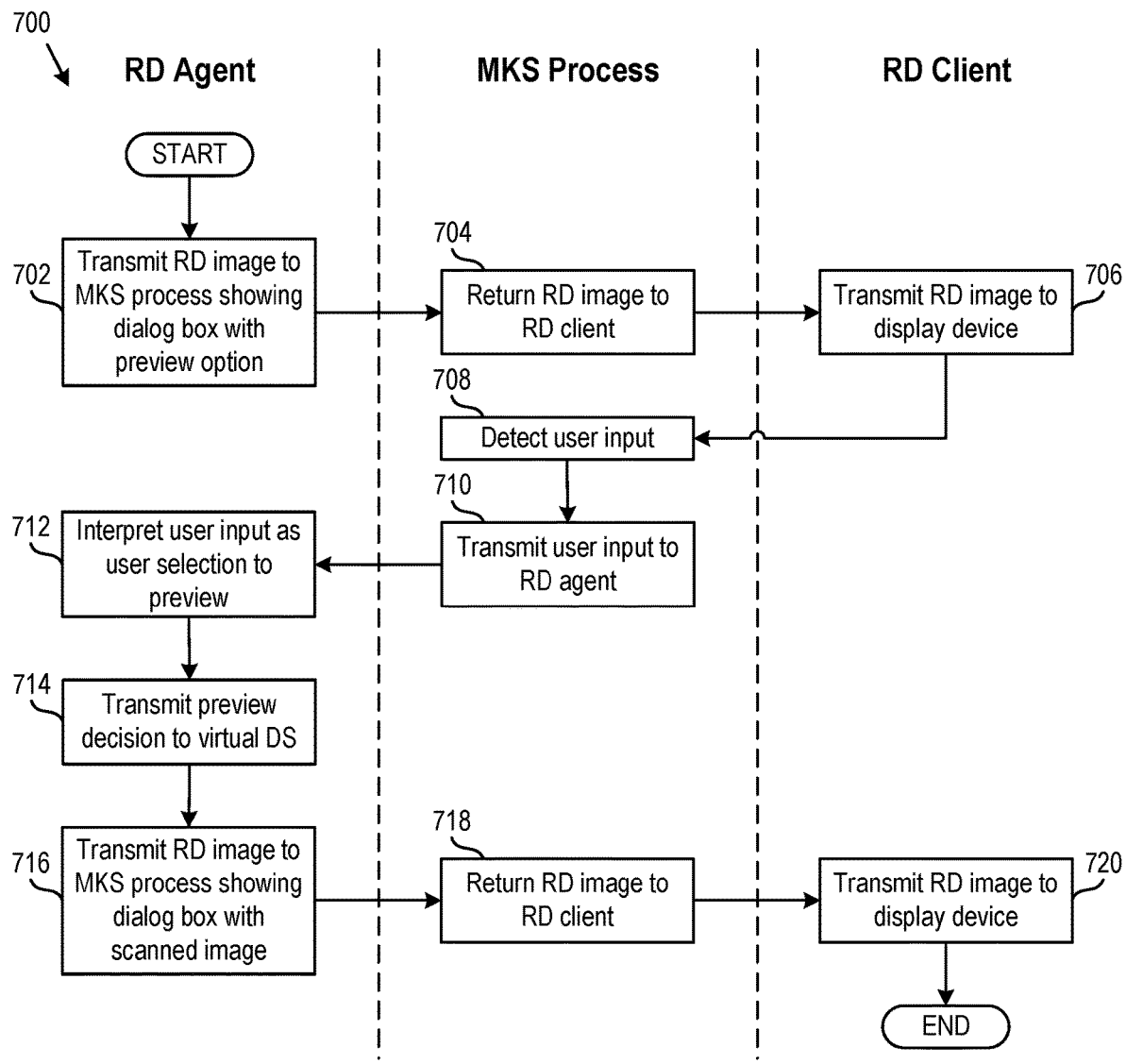
FIG. 7 is a flow diagram of steps performed by remote desktop software of the client computing device and host server to carry out a method of displaying images of the remote desktop to a user of the remote desktop to allow the user to preview a scanned image, according to an embodiment.

FIG. 7 is a flow diagram of steps performed by RD software of client computing device 110 and host server 160 to carry out a method 700 of displaying RD image 142 to the user to allow the user to preview a scanned image, according to embodiments. For example, FIG. 7 will be discussed with respect to flatbed scanner 260. At step 702, RD agent 166 of host server 160 transmits RD image 142 to MKS process 120. RD image 142 illustrates a dialog box of UI 286 including an option to preview a scanned image. At step 704, MKS process 120 returns RD image 142 to RD client 114. At step 706, RD client 114 transmits RD image 142 to display device 140 to be displayed to the user.

At step 708, MKS process 120 detects user input, e.g., a clicking of a mouse or typing on a keyboard. At step 710, MKS process 120 transmits the user input to RD agent 166. At step 712, RD agent 166 interprets the user input as the user selecting to preview the scanned image. At step 714, RD agent 166 transmits the user selection to virtual DS 280, and virtual DS 280 acquires the scanned image and adds the scanned image to the dialog box of UI 286. At step 716, RD agent 166 transmits RD image 142 to MKS process 120, RD image 142 now illustrating the scanned image in the dialog box of UI 286. At step 718, MKS process 120 returns RD image 142 to RD client 114. At step 720, RD client 114 transmits RD image 142 to display device 140 to be displayed to the user. After step 720, method 700 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanning preview method for a remote desktop system that includes a client computing device and a remote computing device, wherein the client computing device and the remote computing device are separate computing devices each having an operating system (OS) executing therein, and the client computing device accesses a remote desktop running on the OS of the remote computing device to interact with an application running in the remote desktop, the scanning preview method comprising:
    in response to a user selection made via an image of a user interface (UI) of the remote desktop, transmitting the user selection from the client computing device to the remote computing device;
    at the client computing device, in response to a request for a preview, the request for the preview having been generated by the remote computing device based on the user selection and then transmitted to the client computing device, using a scanner core running on the OS of the client computing device to transmit a request for an image, to an image capturing device separate from the client computing device;
    upon the scanner core acquiring the image from the image capturing device, transmitting the acquired image from the client computing device to the remote computing device; and
    at the client computing device, displaying an updated image of the UI of the remote desktop received from the remote computing device, wherein the updated image of the UI includes the acquired image and was generated by the remote computing device based on the acquired image transmitted thereto.

2. The scanning preview method of claim 1, wherein in the updated image of the UI, the acquired image is displayed within a dialog box of the application running, in the remote desktop.

3. The scanning preview method of claim 1, wherein the scanner core is a data source, and the client computing device further includes a data source manager for communicating with the data source.

4. The scanning preview method of claim 1, wherein the scanner core is an image capture core, and the client computing device further includes a conversion module that is configured to convert data between being described according to a first scanning protocol that is used by the client computing device and being described according to a second scanning protocol that is used by the remote computing device.

5. The scanning preview method of claim 1, further comprising:
    upon the scanner core acquiring the image from the image capturing device, transmitting a message to the remote computing device indicating that there are no more pending images to be retrieved from the image capturing device using the scanner core.

6. The scanning preview method of claim 1, wherein the image capturing device is a flatbed scanner.

7. The scanning preview method of claim 1, wherein the image capturing device is a sheet-fed scanner, and wherein the scanner core acquires a plurality of images from the image capturing device including the acquired image, but the client computing device only transmits the acquired image of the plurality of images to the remote computing device in response to the request for the preview.

8. A non-transitory computer-readable medium comprising instructions that are executable in a remote desktop system that includes a client computing device and a remote computing device, wherein the client computing device and the remote computing device are separate computing devices each having an operating system (OS) executing therein, and the client computing device accesses a remote desktop running on the OS of the remote computing device to interact with an application running in the remote desktop, and wherein the instructions when executed cause the remote desktop system to carry out a scanning preview method comprising:
in response to a user selection made via an image of a user interface (UI) of the remote desktop, transmitting the user selection from the client computing device to the remote computing device;
at the client computing device, in response to a request for a preview the request for the preview having been generated by the remote computing device based on the user selection and then transmitted to the client computing device, using a scanner core running on the OS of the client computing device to transmit a request for an image, to an image capturing device separate from the client computing device;
upon the scanner core acquiring the image from the image capturing device, transmitting the acquired image from the client computing device to the remote computing device; and
at the client computing device, displaying an updated image of the UI of the remote desktop received from the remote computing device, wherein the updated image of the UI includes the acquired image and was generated by the remote computing device based on the acquired image transmitted thereto.

9. The non-transitory computer-readable medium of claim 8, wherein in the updated image of the UI, the acquired image is displayed within a dialog box of the application running in the remote desktop.

10. The non-transitory computer-readable medium of claim 8, wherein the scanner core is a data source, and the client computing device further includes a data source manager for communicating with the data source.

11. The non-transitory computer-readable medium of claim 8, wherein the scanner core is an image capture core, and the client computing device further includes a conversion module that is configured to convert data between being described according to a first scanning protocol that is used by the client computing device and being described according to a second scanning protocol that is used by the remote computing device.

12. The non-transitory computer-readable medium of claim 8, wherein the scanning preview method further comprises:
upon the scanner core acquiring the image from the image capturing device, transmitting a message to the remote computing device indicating that there are no more pending images to be retrieved from the image capturing device using the scanner core.

13. The non-transitory computer-readable medium of claim 8, wherein the image capturing device is a flatbed scanner.

14. The non-transitory computer-readable medium of claim 8, wherein the image capturing device is a sheet-fed scanner, and wherein the scanner core acquires a plurality of images from the image capturing device including the acquired image, but the client computing device only transmits the acquired image of the plurality of images to the remote computing device in response to the request for the preview.

15. A remote desktop system comprising:
a remote computing device having an operating system (OS) executing therein on which a remote desktop runs; and
a client computing device separate from the remote computing device having an OS executing therein, wherein the client computing device accesses the remote desktop to interact with an application running in the remote desktop, and wherein the client computing device includes a processor configured to perform the following steps:
in response to a user selection made via an image of a user interface (UI) of the remote desktop, transmit the user selection to the remote computing device;
in response to a request for a preview, the request for the preview having been generated by the remote computing device based on the user selection and then transmitted to the client computing device, use a scanner core running on the OS of the client computing device to transmit a request for an image, to an image capturing device separate from the client computing device;
upon the scanner core acquiring the image from the image capturing device, transmit the acquired image to the remote computing device; and
display an updated image of the UI of the remote desktop received from the remote computing device, wherein the updated image of the UI includes the acquired image and was generated by the remote computing device based on the acquired image transmitted thereto.

16. The remote desktop system of claim 15, wherein in the updated image of the UI, the acquired image is displayed within a dialog box of the application running in the remote desktop.

17. The remote desktop system of claim 15, wherein the scanner core is a data source, and the client computing device further includes a data source manager running on the processor of the client computing device for communicating with the data source.

18. The remote desktop system of claim 15, wherein the scanner core is an image capture core, and the client computing device further includes a conversion module running on the processor of the client computing device that is configured to convert data between being described according to a first scanning protocol that is used by the client computing device and being described according to a second scanning protocol that is used by the remote computing device.

19. The remote desktop system of claim 15, wherein the processor of the client computing device is further configured to:
upon the scanner core acquiring the image from the image capturing device, transmit a message to the remote computing device indicating that there are no more pending images to be retrieved from the image capturing device using the scanner core.

20. The remote desktop system of claim 15, wherein the image capturing device is a sheet-fed scanner, and wherein the scanner core acquires a plurality of images from the image capturing device including the acquired image, but the processor of the client computing device only transmits the acquired image of the plurality of images to the remote computing device in response to the request for the preview.

* * * * *